J. A. STEINHILPER.
CALIPERS.
APPLICATION FILED JUNE 2, 1917.
1,264,571.
Patented Apr. 30, 1918.
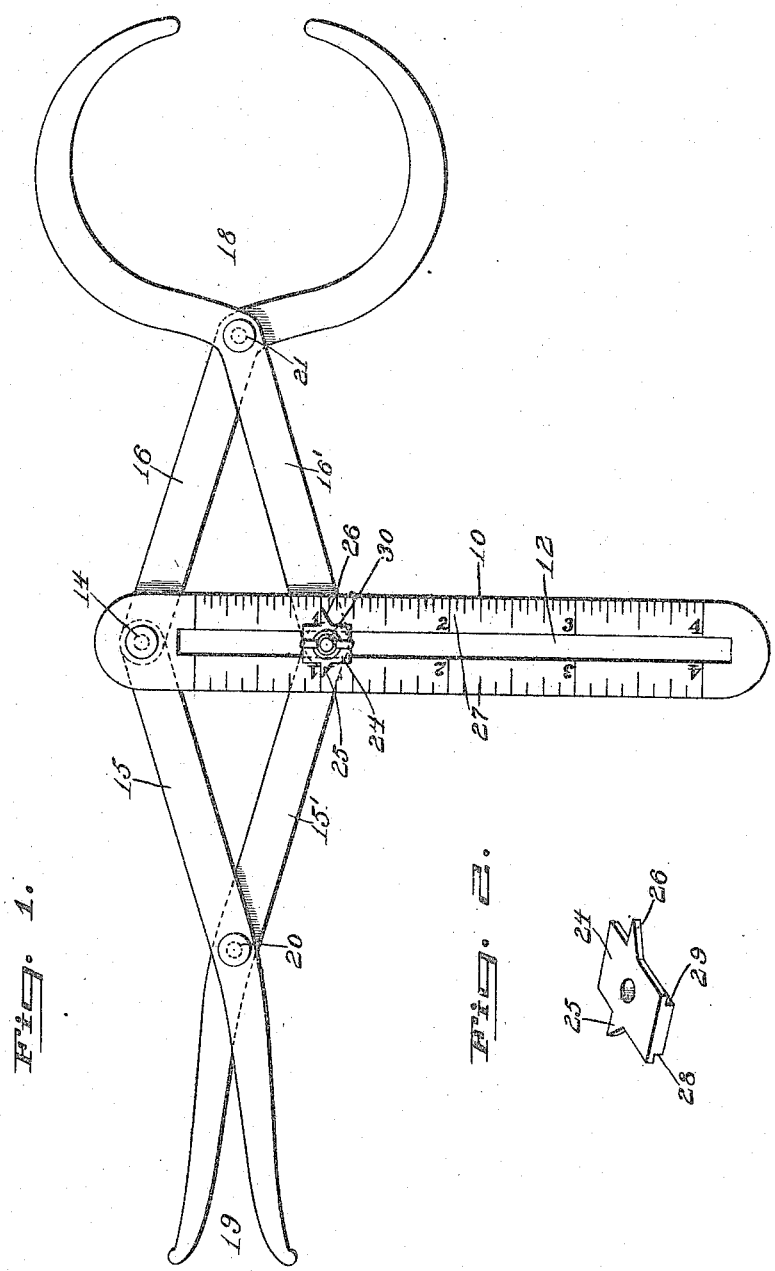
WITNESSES
G. E. Logan Jr.
E. M. Springer.
INVENTOR
John A. Steinhilper
BY Victor J. Evans
ATTORNEY

UNITED STATES PATENT OFFICE.

JOHN A. STEINHILPER, OF WILLIAMSPORT, PENNSYLVANIA.

CALIPERS.

1,264,571.  Specification of Letters Patent. Patented Apr. 30, 1918.

Application filed June 2, 1917. Serial No. 172,447.

*To all whom it may concern:*

Be it known that I, JOHN A. STEINHILPER, a citizen of the United States, residing at Williamsport, in the county of Lycoming and State of Pennsylvania, have invented new and useful Improvements in Calipers, of which the following is a specification.

This invention relates to calipers and the object is to provide an instrument which may be used for making both outside and inside measurements, and in which the outer measurement may be determined from the inner measurement, if desired, or vice versa.

A further object is to provide means whereby very accurate measurements may be made, because of the rigidity of the elements of the instrument, the means for securing them in position when adjusted, and the manner of guiding the indicator or pointer.

In the accompanying drawings:

Figure 1 is a plan view of the device.

Fig. 2 is a view in perspective of the guide member and pointer.

The instrument comprises two pairs of calipers pivotally connected with each other at their end portions, one of the pivotal connections constituting also a connection between the legs of the calipers and a scale, said scale being slotted longitudinally and providing for a thumb nut and pointer, the pointer coöperating with the scale and the thumb nut serving to tighten the joint between the ends of the other two legs of the respective pairs.

The scale member is designated 10 and is provided with a slot 12 extending longitudinally throughout the greater portion of its length, this scale being connected by means of a pivot 14 with the legs 15 and 16 of the respective pairs of calipers. The pair for use in taking outside measurements is designated 18 and that for taking inside measurements, 19. The coöperating legs of the respective pairs are designated 15' and 16', a pivotal connection being provided at the point 20 and also at the point 21.

A guide member and pointer is designated 24 and is provided with laterally extending devices 25 and 26 constituting the pointers proper, coöperating with the graduations 27 of the scale member 10. Member 24 is cut away as shown at 28 and 29, the cut away portions coöperating with the edges of the slot 12. This pointer is connected with legs 15' and 16' by means of a thumb member and bolt or screw, this member being designated 30 and providing for holding the elements in rigid position when the measurement has been taken.

It will be observed that the legs of the respective pairs connected as described form a type of toggle structure and that the slotted scale serves to firmly brace this structure at oppositely located pivotal points, thus permitting very accurate measurements to be taken.

What is claimed is:

1. In a device of the class described, a plurality of pairs of pivoted legs, the ends of the legs of one pair being pivotally connected to the corresponding ends of the legs of the other pair, and a scale connected with one of the pivotal connections between the pairs, and being slidable with reference to the other pivotal connection between said pairs.

2. In a device of the class described, a plurality of pivoted legs, means for pivotally connecting the legs of one pair with those of another, a scale member permanently and pivotally connected with certain of the legs of the respective pairs, and slidable with reference to the other legs of said pairs.

3. In a device of the class described, a plurality of pairs of pivoted legs, one leg of each pair being pivotally connected with a leg of the opposite pair, the remaining legs of the respective pairs being pivotally connected, a scale member extending transversely of the connected ends of the pairs, and means for holding the scale member rigidly in position on said legs, said member constituting a brace.

4. In a device of the class described, a pair of calipers including a plurality of curved arms, a plurality of substantially straight arms, the ends of the arms of the respective pairs being pivotally connected with each other at points opposite the operative ends thereof, a slotted scale permanently secured to certain of the pivotal connections of the respective pairs, and an indicating device secured to certain oppositely located legs of the respective pairs and slidable with reference to the slot of the scale member.

5. In a device of the class described, a plurality of pairs of calipers, each including measuring arms and operating arms, means for pivotally connecting certain of the operating arms of the respective pairs, a scale member secured to the said point of connection, means for connecting the remaining operating arms of the respective pairs and slidable on the scale member, and a guiding and indicating device secured to the means last mentioned.

In testimony whereof I affix my signature.

JOHN A. STEINHILPER.

Copies of this patent may be obtained for five cents each, by addressing the "Commissioner of Patents, Washington, D. C."